UNITED STATES PATENT OFFICE.

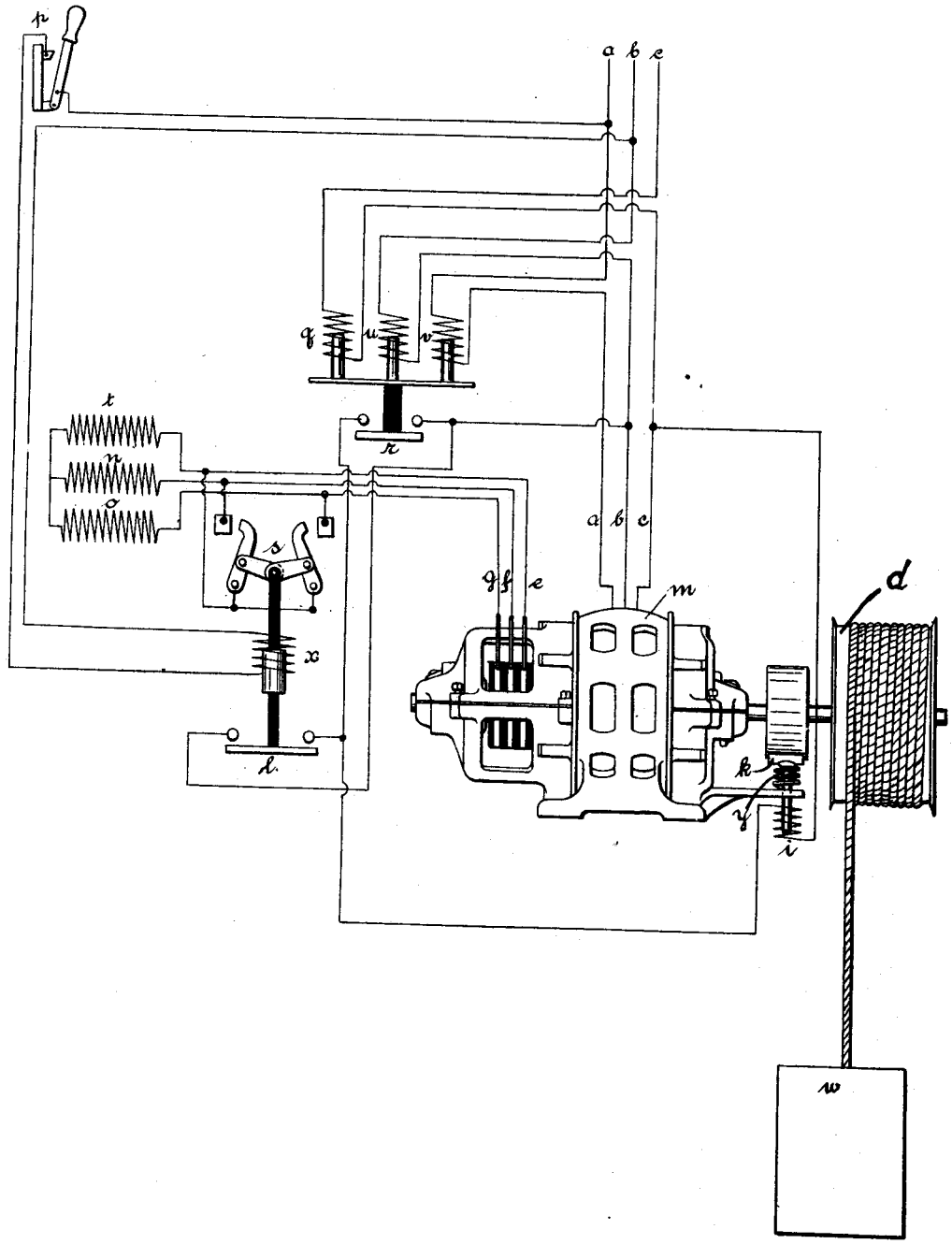

BENJAMIN McINNERNEY, OF COUNCIL BLUFFS, IOWA.

ELECTRICAL REGULATION FOR ELECTRIC MOTORS.

1,066,513.   Specification of Letters Patent.   Patented July 8, 1913.

Application filed August 26, 1911.   Serial No. 646,282.

*To all whom it may concern:*

Be it known that I, BENJAMIN MCINNERNEY, a citizen of the United States, residing at Council Bluffs, in the county of Pottawattamie, State of Iowa, have invented a new and useful Electrical Regulation for Electric Motors, of which the following is a specification.

My invention relates to improvement in regulation of electric motors wherein the resistance in the motor circuits is varied and the object of my improvement is to automatically reduce the speed of an induction motor, either when acting against or with the load.

It is well known that introducing resistance into the secondary of an induction motor will tend to reduce the speed, if the motor is operating against the load, it will also tend to cause the motor to race where the conditions are such that the load tends to drive the motor.

My invention is designed to overcome this difficulty.

I attain these objects by the structure and mechanism illustrated in the accompanying drawing in which the figure is a side elevation of any ordinary induction motor with a suspended load and a diagram of circuits, switches and resistances.

Similar letters refer to similar parts throughout the several views.

$m$, is any ordinary induction motor having a phase wound rotor secondary, and a stationary primary which is supplied with alternating current through the leads, $a$, $b$, and $c$. Here shown for convenience, as a three-phase motor, though my invention is equally applicable to motors wound for any number of phases.

$d$, represents any means of applying a load to the motor, here shown as a winding drum with the load $w$, applied in the form of a weight.

The secondary circuits of the induction motor are brought out through the usual slip rings and the connections $g$, $f$, and $e$, here being shown as a three-phase circuit but which may be varied to adapt it to the phase employed with the motor. In the circuits formed through the connections, $g$, $f$, and $e$, are placed suitable resistances, $t$, $n$, and $o$.

$s$, is a switch of any suitable form adapted to short circuit the resistances, $t$, $n$, and $o$, here shown as accomplishing this by the solenoid $x$, which when energized actuates the switch $s$. Connected to operate with the switch $s$, is the switch $l$ which is adapted to open and close a circuit through the solenoid $i$. In the lead $a$, is placed the solenoid $v$, and in the leads, $b$, and $c$, similar solenoids are shown respectively, $u$, and $q$. The solenoids $v$, $u$, and $q$, operate the switch $r$, which is in parallel with switch $l$. The controlling switch $p$, is placed in a circuit taken from two of the leads, as $a$, and $b$, through the solenoid $x$, operating the switch $l$, and the switch $s$.

$k$, is any suitable retarding mechanism in this instance, shown as a shoe brake applied to a rotating part by means of a spring $y$, and adapted to be released by the solenoid $i$, or similar means.

While here illustrating my invention by a three-phase motor, it is obvious that my invention can be applied to motors having any number of phases. It will also be obvious that the switch $r$, may be operated by a solenoid in the circuit of one lead only, but I prefer to balance the circuits by inserting a solenoid in each lead. Current is supplied to the leads, $a$, $b$, and $c$, from any usual source. Assuming that such current is supplied in the leads, $a$, $b$, and $c$, to operate the motor to raise the load $w$, the solenoids, $v$, $u$, and $q$, will be energized, and when the current in the primary becomes strong enough to operate the switch $r$, will close the circuit through the solenoid $i$, releasing the retarding brake $k$. Then the load will be lifted at a speed determined by the characteristics of the motor including the resistances $o$, $n$, and $t$, in the secondary. Assuming that such current is supplied in the leads, $a$, $b$, and $c$, to operate the motor to lower the load $w$, the first inrush of current may be sufficient to close switch $r$, and release retarding brake $k$, but immediately thereafter, the action of the load will tend to reduce the current in the primary of motor, until switch $r$, opens and the retarding brake $k$, is applied tending to decrease the speed. To increase the speed of the motor $m$, the operating switch $p$, is closed, the solenoid $x$, will be energized closing the switches $s$, and $l$, short circuiting the resistances $o$, $n$, and $t$, and releasing the retarding brake $k$, as heretofore described. Then when said switch $p$, remains closed, the speed of the motor will be controlled by its own counter-electromotive force, either when running with or against the load, and regardless whether the switch $r$, is open or closed.

It is evident that the retarding brake $k$, is not limited to the form of drum and shoe shown, but may consist of any retarding means controlled by switches $r$, and $l$. It is also evident that my invention may be similarly applicable to motors in which the speed is varied by other means, as by varying the impressed voltage in the primary.

What I claim and desire to secure by Letters Patent is:

1. The combination of an induction motor; a resistance in the secondary of said motor; a means for varying the resistance in said secondary of said motor; a switch actuated by series solenoids in the motor circuit; a switch in parallel with said first named switch and actuated coincidently with the means for varying the resistance in said secondary, and a means for retarding the said motor, the said retarding means being varied by the operation of the said switches in parallel.

2. The combination of an induction motor; a resistance in the secondary of said motor; a means for varying the resistance in said secondary of said motor; a switch actuated by series solenoids in the motor circuit; a switch in parallel with said first named switch and actuated coincidently with the means for varying the resistance in said secondary; a means for retarding the said motor, the said retarding means being varied by the operation of the said switches in parallel, and an operating switch adapted to control the means for varying the resistance in said secondary of said motor.

BENJAMIN McINNERNEY.

Witnesses:
HENRY PETERSON,
EDNA WATERMAN.

Copies of this patent may be obtained for five cents each, by addressing the "Commissioner of Patents, Washington, D. C."